(12) United States Patent
Sakabe

(10) Patent No.: US 12,156,074 B2
(45) Date of Patent: Nov. 26, 2024

(54) WIRELESS COMMUNICATION APPARATUS THAT PERFORMS WIRELESS COMMUNICATION WITH BANDWIDTH OUTPUT BY TRAINED MODEL

(71) Applicant: KYOCERA Document Solutions Inc., Osaka (JP)

(72) Inventor: Keiji Sakabe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 368 days.

(21) Appl. No.: 17/723,560

(22) Filed: Apr. 19, 2022

(65) Prior Publication Data

US 2022/0338055 A1 Oct. 20, 2022

(30) Foreign Application Priority Data

Apr. 20, 2021 (JP) ................................ 2021-071121

(51) Int. Cl.
*H04W 4/00* (2018.01)
*H04W 28/02* (2009.01)

(52) U.S. Cl.
CPC ... *H04W 28/0289* (2013.01); *H04W 28/0226* (2013.01); *H04W 28/0236* (2013.01); *H04W 28/0273* (2013.01); *H04W 28/0284* (2013.01)

(58) Field of Classification Search
CPC ......... H04W 28/0289; H04W 28/0284; H04W 28/0226
See application file for complete search history.

(56) References Cited

U.S. PATENT DOCUMENTS

| 11,677,680 | B2* | 6/2023 | Sethi | H04L 43/20 709/226 |
| 11,863,465 | B1* | 1/2024 | Nijim | H04L 47/805 |
| 2015/0373582 | A1* | 12/2015 | Valliappan | H04W 72/52 370/329 |
| 2021/0084494 | A1* | 3/2021 | Angelov | H04L 47/83 |
| 2022/0191453 | A1* | 6/2022 | Wang | H04N 21/234327 |

FOREIGN PATENT DOCUMENTS

JP 2018-133657 A 8/2018

\* cited by examiner

*Primary Examiner* — Elisabeth Benoit Magloire
(74) *Attorney, Agent, or Firm* — Studebaker & Brackett PC

(57) ABSTRACT

A wireless communication section wirelessly communicates with a communication terminal present in a target space. An information acquiring section acquires a value representing congestion of a target space. A learned model is a model that has been trained using training data including a value representing the congestion of a target space used for learning, a bandwidth, a channel, and throughput. An AI processing section inputs the value representing the congestion of the target space acquired by the information acquiring section to the learned model and acquires a bandwidth and a channel output by the learned model. A bandwidth controller causes the wireless communication section to perform wireless communication using the bandwidth acquired by the AI processing section. The channel controller causes the wireless communication section to perform wireless communication using the channel acquired by the AI processing section.

8 Claims, 4 Drawing Sheets

WIRELESS COMMUNICATION APPARATUS THAT PERFORMS WIRELESS COMMUNICATION WITH BANDWIDTH OUTPUT BY TRAINED MODEL

INCORPORATION BY REFERENCE

The present application claims priority under 35 U.S.C. § 119 to Japanese Patent Application No. 2021-071121, filed on Apr. 20, 2021. The contents of this application are incorporated herein by reference in their entirety.

BACKGROUND

The present disclosure relates to a wireless communication apparatus.

There is a technique called "channel bonding" for improving throughput (effective transfer rate per unit of time on a communication line) in wireless local-area network (LAN) communication. Channel bonding increases the amount of data which can be sent and received at one time by grouping together a plurality of channels used for communication to increase bandwidth. However, as the number of stations connected to an access point increases, a problem arises in which radio interference between stations causes a decrease in throughput.

SUMMARY

A wireless communication apparatus according to an aspect of the present disclosure includes a wireless communication section, an information acquiring section, an AI processing section, and a bandwidth controller. The wireless communication section wirelessly communicates with a communication terminal present in a target space. The information acquiring section acquires a value representing congestion of the target space. The AI processing section inputs the value representing the congestion of the target space acquired by the information acquiring section to a learned model trained with training data including a value representing the congestion of a target space used learning, a bandwidth, and throughput and acquires a bandwidth output by the learned model. The bandwidth controller causes the wireless communication section to perform wireless communication using the bandwidth acquired by the AI processing section.

DETAILED DESCRIPTION

Figure 1:
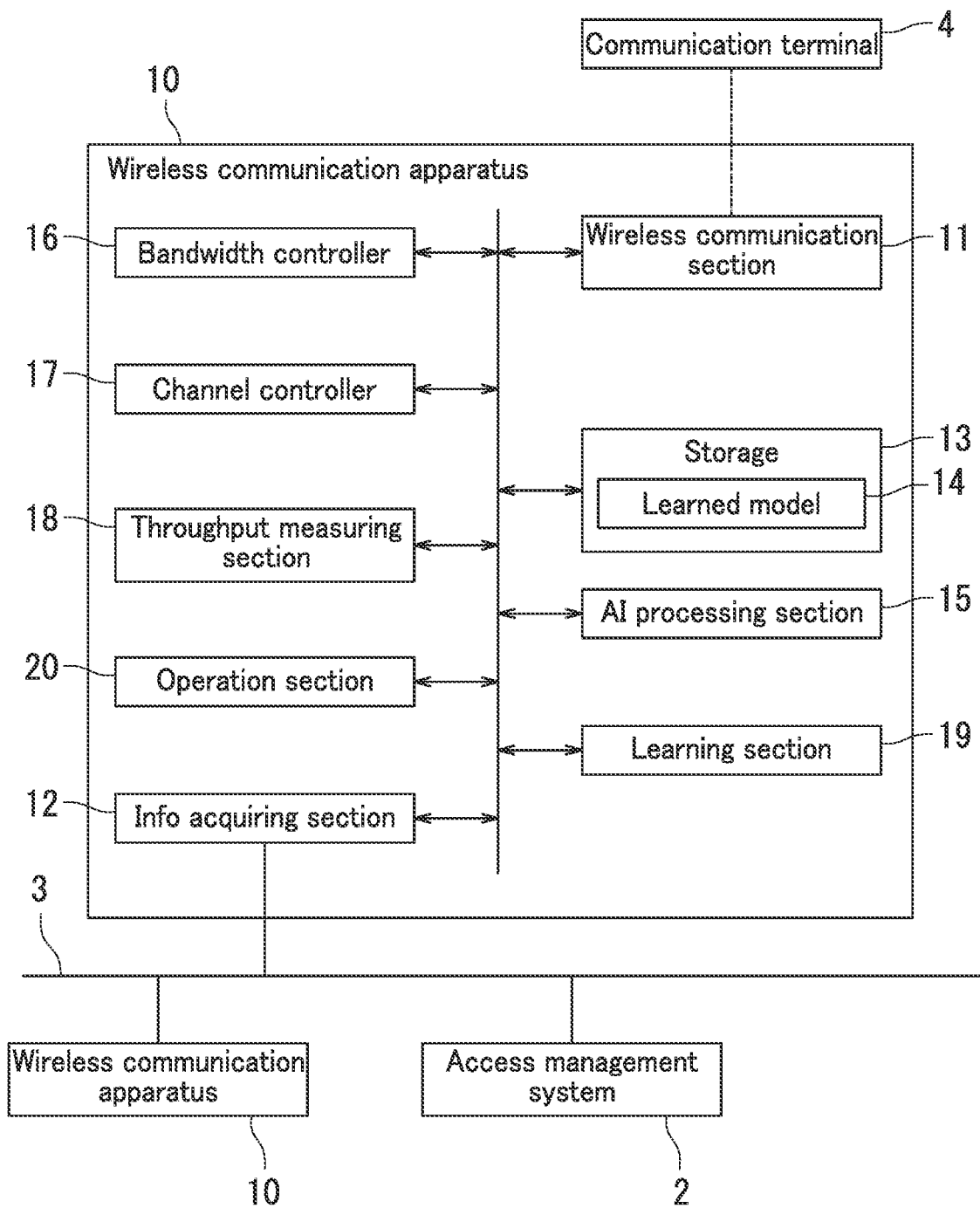
FIG. 1 is a block diagram illustrating a configuration of a wireless communication system according to a first embodiment.

The following describes an embodiment of the present disclosure with reference to the accompanying drawings. Elements which are the same or equivalent are labeled with the same reference signs in the drawings and description thereof is not repeated.

First Embodiment

A wireless communication system 1 according to a first embodiment is described with reference to FIGS. 1 to 4. FIG. 1 is a block diagram illustrating a configuration of the wireless communication system 1 of the first embodiment.

The wireless communication system 1 includes wireless communication apparatuses 10, an access management system 2, a network 3, and communication terminals 4. The wireless communication system 1 is installed in a target space. The target space is an office, for example. In the following, an office is used as an example of the target space.

A wireless communication apparatus 10 is a wireless LAN access point. The wireless communication apparatus 10 is connected to a communication terminal 4, which is a station, and performs wireless communication. In FIG. 1, the wireless connection between the wireless communication apparatus 10 and the communication terminal 4 is indicated by a dotted line. Note that although two wireless communication apparatuses 10 are illustrated in FIG. 1, any number of wireless communication apparatuses 10 may be included in the wireless communication system 1.

The access management system 2 is a system which manages people entering and exiting the office, which is the target space. That is, the access management system 2 manages the number of people in the office.

The access management system 2 and the wireless communication apparatus 10 are connected via the network 3. The network 3 is ETHERNET (registered Japanese trademark), for example.

The communication terminal 4 is a wireless LAN station. Examples of the communication terminal 4 include a personal computer, a tablet computer, and a smartphone. The communication terminal 4 is connected to the wireless communication apparatus 10, which is an access point, and performs wireless communication. Note that although only one communication terminal 4 is illustrated as connected to the wireless communication apparatus 10 in FIG. 1, any number of communication terminals 4 may be connected to the wireless communication apparatus 10.

Next, the wireless communication apparatus 10 is described. The wireless communication apparatus 10 includes a wireless communication section 11, an information acquiring section 12, storage 13, a learned model 14, an artificial intelligence (AI) processing section 15, a bandwidth controller 16, a channel controller 17, a throughput measuring section 18, and a learning section 19. The wireless communication apparatus 10 may also be configured to include an operation section 20.

The wireless communication section 11 performs wireless communication with one or more communication terminals 4. The bandwidth used by the wireless communication section 11 for wireless communication is controlled by the bandwidth controller 16. Channels used by the wireless communication section 11 for wireless communication are controlled by the channel controller 17.

The information acquiring section 12 acquires a value representing the congestion of the office. As a specific example, the information acquiring section 12 acquires a number of people present in the office from the access management system 2 through the network 3 as a value representing the congestion of the office.

The storage 13 stores the learned model 14 generated by the learning section 19. The learned model 14 is trained using the value representing the congestion of the office, the bandwidth and channels used by the wireless LAN, and a throughput measurement result as training data.

The AI processing section 15 uses the learned model 14 stored in the storage 13 to estimate the bandwidth and channels through which optimal throughput can be obtained according to the congestion of the office. The AI processing section 15 notifies the bandwidth controller 16 of the estimated bandwidth and notifies the channel controller 17 of the estimated channels.

Figure 2:
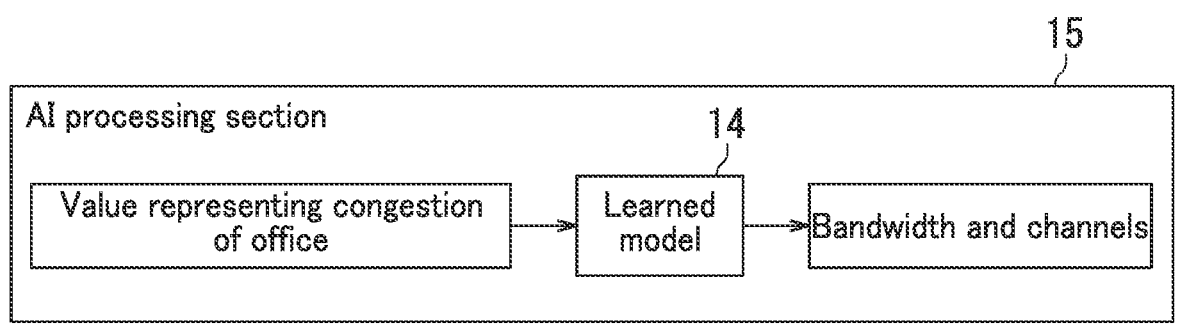
FIG. 2 is a diagram illustrating an operating concept of an AI processing section of a wireless communication apparatus according to the first embodiment.

FIG. 2 is a diagram illustrating an operating concept of the AI processing section 15 of the wireless communication apparatus 10 of the first embodiment. The AI processing section 15 acquires a value representing the congestion of the office from the information acquiring section 12 and inputs the value to the learned model 14. The learned model 14 estimates and outputs the optimal bandwidth and channels according to the congestion of the office. The AI processing section 15 acquires the bandwidth and channels output by the learned model 14.

The bandwidth controller 16 causes the wireless communication section 11 to perform wireless communication using the bandwidth acquired from the learned model 14 by the AI processing section 15.

The channel controller 17 causes the wireless communication section 11 to perform wireless communication using the channels acquired from the learned model 14 by the AI processing section 15.

Figure 3:
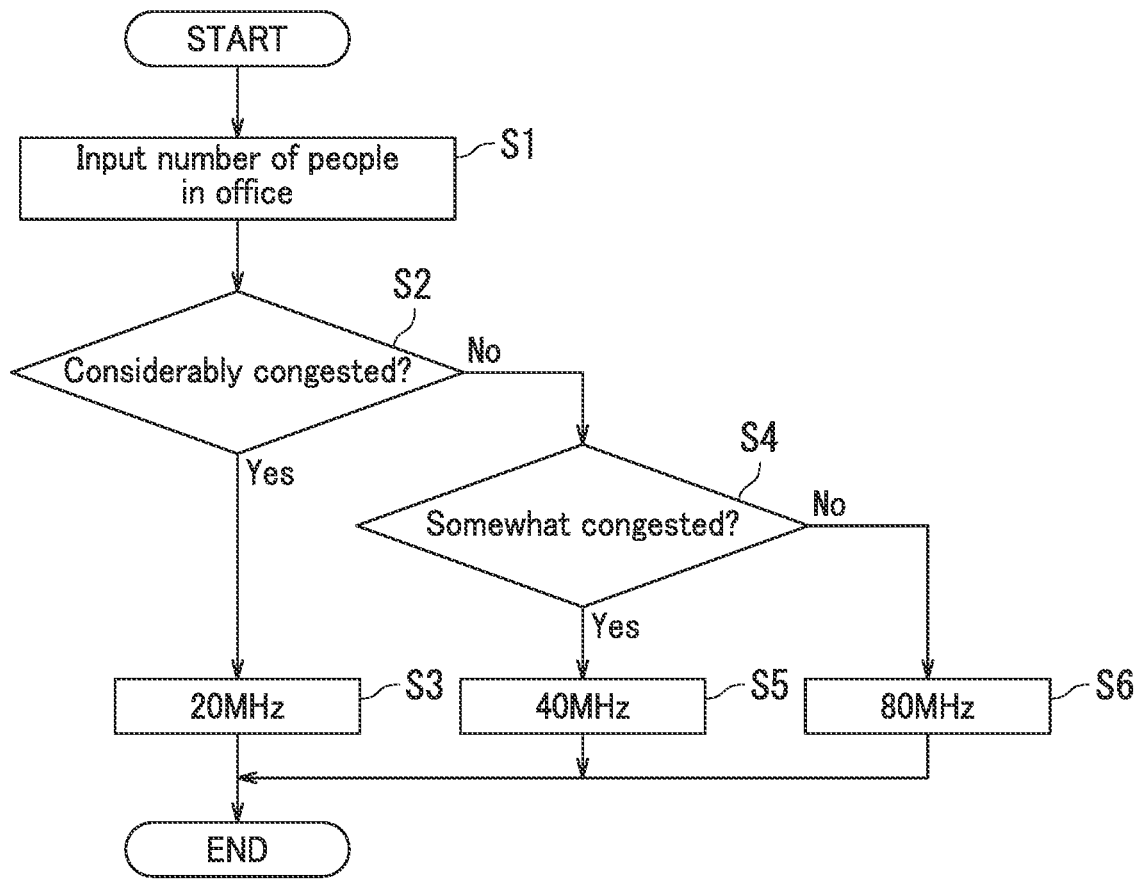
FIG. 3 is a flowchart depicting an operating concept of the wireless communication apparatus of the first embodiment.

FIG. 3 is a flowchart depicting an operating concept of the wireless communication apparatus 10 of the first embodiment. The wireless communication apparatus 10 repeatedly performs the operation depicted in the flowchart of FIG. 3. The wireless communication section 11 is assumed to be capable of using three different bandwidths: 20 MHz, 40 MHz, and 80 MHz. Furthermore, channels are respectively denoted as ch. 1, ch. 2, ch. 3, and so on. When the channel numbers are consecutive, the frequency bands are also consecutive. The frequency band per channel is assumed to be 20 MHz.

In Step S1, the information acquiring section 12 acquires the number of people in the office from the access management system 2. The AI processing section 15 inputs the number of people in the office acquired by the information acquiring section 12 to the learned model 14.

When the office is considerably congested (Step S2: Yes), the number of communication terminals 4 connected to the wireless communication section 11 is expected to increase. In this case, in order to inhibit radio interference between the communication terminals 4 connected to the wireless communication section 11, the learned model 14 outputs 20 MHz, which is the narrowest bandwidth, and channel ch. 1 (Step S3). By controlling the wireless communication of the wireless communication section 11 to within a narrow bandwidth, the connectivity and minimum throughput of the communication terminals 4 and the wireless communication section 11 are assured.

When the office is somewhat congested (Step S4: Yes), the number of communication terminals 4 connected to the wireless communication section 11 is expected to increase to a lesser degree. In this case, radio interference between the communication terminals 4 connected to the wireless communication section 11 hardly occurs. Therefore, the learned model 14 outputs a bandwidth of 40 MHz and consecutive channels ch. 1 and ch. 2 (Step S5).

When the office is not congested (Step S4: No), the number of communication terminals 4 connected to the wireless communication section 11 is expected to decrease. In this case, radio interference between the communication terminals 4 connected to the wireless communication section 11 is less likely to occur. Therefore, the learned model 14 outputs 80 MHz, which is the widest bandwidth, and channels ch. 1, ch. 2, ch. 3, and ch. 4 (Step S6). Through the above, high throughput is assured.

As conceptually depicted in the flowchart of FIG. 3, the wireless communication apparatus 10 of the first embodiment automatically performs bandwidth control according to the state of congestion in the office. The correspondence in the learned model 14 between the state of congestion and the bandwidth used is trained through supervised learning as described below.

The throughput measuring section 18 measures the throughput to and from the communication terminals 4 based on received data received from the communication terminals 4 by the wireless communication section 11. Since the method of measuring throughput can use known techniques, description thereof is omitted.

Figure 4:
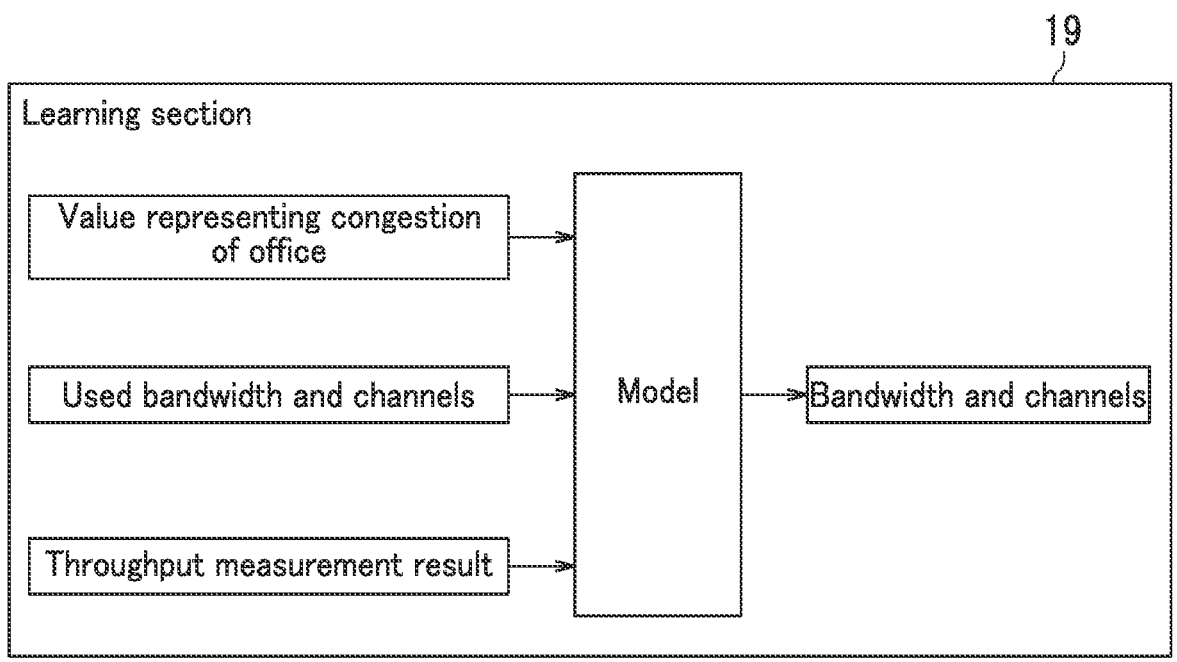
FIG. 4 is a diagram illustrating an operating concept of a learning section of the wireless communication apparatus of the first embodiment.

The learning section 19 performs supervised learning to generate the learned model 14. FIG. 4 is a diagram illustrating an operating concept of the learning section 19 of the wireless communication apparatus 10 of the first embodiment. The learning section 19 uses, as one set of training data, a value representing the congestion of the office acquired from the access management system 2 by the information acquiring section 12, the bandwidth and channels being used by the wireless communication section 11, and a throughput measurement result measured by the throughput measuring section 18 at an arbitrary sampling timing. The learning section 19 generates the learned model 14 which has been trained with the correspondence between the congestion of the office and the bandwidth and channels which optimize the throughput using multiple sets of training data.

The learning section 19 uses a timing that matches the usage environment of the wireless communication apparatus 10, such as daily or per time slot, as the sampling timing of the various data to be used as training data. Per time slot means hourly, in the morning, in the afternoon, at a prescribed time before working hours, during working hours, or at a prescribed time after working hours, for example. The sampling timing is assumed to be set to the learning section 19 and be changeable by a user.

For example, the learning section 19 collects the various data to be used as training data at a prescribed time before working hours, during working hours, and at a prescribed time after working hours on each day of the week from Monday to Friday. The learning section 19 generates the learned model 14 using multiple sets of collected training data. As a result, for example, a learned model 14 is generated in which radio interference is reduced by increasing bandwidth before and after working hours because the office is not congested, and reducing bandwidth during working hours because the office is congested.

The learning section 19 may generate a learned model 14 for each sampling timing. For example, the learning section 19 collects the various data to be used as training data at a prescribed time before working hours, during working hours, and at a prescribed time after working hours. In this case, the learning section 19 generates a first learned model 14 using the training data collected at the prescribed time before working hours, a second learned model 14 using the training data collected during working hours, and a third learned model 14 using the training data collected at the prescribed time after working hours. The AI processing section 15 uses the first learned model 14 at the prescribed time before working hours, uses the second learned model 14 during working hours, and uses the third learned model 14 at the prescribed time after working hours.

In consideration of things such as reorganization of the wireless communication system 1 and changes that may occur in the environment and scale of the office, the learning section 19 may perform retraining of the learned model 14.

As a specific example, the learning section 19 may collect the various data to be used as training data while the bandwidth controller 16 and the channel controller 17 are controlling the wireless communication section 11 using the learned model 14. The various data to be used as training data are a value representing the congestion of the office acquired from the access management system 2 by the information acquiring section 12, the bandwidth and channels being used by the wireless communication section 11, and a throughput measurement result measured by the throughput measuring section 18. The learning section 19 retrains the learned model 14 stored by the storage 13 using multiple sets of collected training data.

When retraining the learned model 14, the learning section 19 uses training data collected at an arbitrary sampling timing in the same manner as during the first training.

The wireless communication section 11, the bandwidth controller 16, the channel controller 17, and the throughput measuring section 18 illustrated in FIG. 1 are communication circuits. The information acquiring section 12 is a network interface. The storage 13 is memory such as a hard disk drive (HDD) or a solid-state drive (SSD).

The AI processing section 15 and the learning section 19 have a processor such as a central processing unit (CPU) and memory such as read-only memory (ROM) and random-access memory (RAM). By having the processor execute a computer program prestored in the memory, the AI processing section 15 and the learning section 19 perform various processing specified in the computer program.

As described above with reference to FIGS. 1 to 4, a wireless communication apparatus 10 includes a wireless communication section 11, an information acquiring section 12, a learned model 14, an AI processing section 15, a bandwidth controller 16, and a channel controller 17. The wireless communication section 11 wirelessly communicates with communication terminals 4 present in a target space. The information acquiring section 12 acquires a value representing the congestion of the target space. The learned model 14 is a model that has been trained using training data including a value representing the congestion of a target space used for learning, bandwidth, channels, and throughput. The AI processing section 15 inputs the value representing the congestion of the target space acquired by the information acquiring section 12 to the learned model 14 and acquires a bandwidth and channels output by the learned model 14. The bandwidth controller 16 causes the wireless communication section 11 to perform wireless communication using the bandwidth acquired by the AI processing section 15. The channel controller 17 causes the wireless communication section 11 to perform wireless communication using the channels acquired by the AI processing section 15. Through the above, a wireless communication apparatus 10 can be provided that automatically switches to the bandwidth and channels providing optimal throughput according to the congestion of an office. Furthermore, a user need not manually switch the bandwidth and channels of the wireless communication apparatus 10.

The information acquiring section 12 acquires the number of people present in the target space from an access management system 2 installed in the target space as the value representing the congestion of the target space. People present in the target space are likely to use the communication terminals 4. As such, when the number of people present in the target space increases, the number of communication terminals 4 connected to the wireless communication apparatus 10 tends to increase. When the number of people present in the target space decreases, the number of communication terminals 4 connected to the wireless communication apparatus 10 tends to decrease. Therefore, the wireless communication apparatus 10 can use the number of people present in the target space managed by the access management system 2 as the value representing the congestion of the target space.

The wireless communication apparatus 10 includes a throughput measuring section 18 and a learning section 19. The throughput measuring section 18 measures the throughput of wireless communication by the wireless communication section 11. The learning section 19 retrains the learned model 14 using the value representing the congestion of the target space acquired by the information acquiring section 12, the bandwidth and channels used by the wireless communication section 11, and a throughput measurement result measured by the throughput measuring section 18. The learned model 14 improves in accuracy due to the learning section 19 retraining the learned model 14 according to changes in the usage environment of the wireless communication apparatus 10.

The learning section 19 generates the learned model 14 by performing training using the value representing the congestion of the target space acquired by the information acquiring section 12, the bandwidth and channels used by the wireless communication section 11, and the throughput measurement result measured by the throughput measuring section 18. By using the training data collected under the usage environment of the wireless communication apparatus 10, a highly accurate learned model 14 can be generated.

The learning section 19 collects training data either or both daily and per time slot. In this way, the learning section 19 can select a sampling timing of the training data matching the usage environment of the wireless communication apparatus 10.

An embodiment of the present disclosure is described above with reference to the accompanying drawings (FIGS. 1 to 4). However, the present disclosure is not limited to the above embodiment, and can be implemented in various manners within a scope not departing from the gist thereof. First to fifth variations are described below.

<First Variation>

In the first embodiment, the wireless communication apparatus 10 was configured to include a learning section 19 which generates and retrains a learned model 14, but the wireless communication apparatus 10 may not include a learning section 19. For example, a learning apparatus assembled outside of the wireless communication apparatus 10 may acquire a used bandwidth, used channels, and a throughput measurement result from the wireless communication apparatus 10 and acquire a value representing the congestion of the target space from the access management system 2. The learning apparatus generates a learned model 14 using training data including the various acquired data. The learning apparatus stores the generated learned model 14 in the storage 13 of the wireless communication apparatus 10. The learning apparatus also periodically retrains the learned model 14 stored in the storage 13.

<Second Variation>

In the first embodiment, the learning section 19 was configured to generate and retrain a learned model 14, but the learning section 19 may be configured to only generate or only retrain a learned model 14. When the learning section 19 is configured to only retrain a learned model 14, for example, the learned model 14 is generated beforehand using generic training data and stored in the storage 13. The learning section 19 retrains the generic learned model 14 stored in the storage 13 using training data collected under the usage environment of the wireless communication apparatus 10. Through the above, the accuracy of the learned model 14 is improved.

<Third Variation>

In the first embodiment, the number of people present in the target space was used as a value representing the congestion of the target space, but this is not a limitation. For example, the total number of communication terminals 4 connected to all wireless communication apparatuses 10 present in the target space may be used as the value representing the congestion of the target space.

As illustrated in FIG. 1, when there are two wireless communication apparatuses 10 in the target space, the information acquiring section 12 of one of the wireless communication apparatuses 10 acquires the number of communication terminals 4 connected to the wireless communication section 11 of that wireless communication apparatus 10, and acquires the number of communication terminals 4 connected to the other wireless communication apparatus 10 from the other wireless communication apparatus 10. The information acquiring section 12 of the one wireless communication apparatus 10 uses the sum of the number of communication terminals 4 connected to the wireless communication section 11 of that wireless communication apparatus 10 and the number of communication terminals 4 connected to the other wireless communication apparatus 10 as the value representing the congestion of the target space. In this way, a wireless communication apparatus 10 can use the number of communication terminals 4 connected to all wireless communication apparatuses 10 in the target space as the value representing the congestion of the target space.

<Fourth Variation>

When a plurality of wireless communication apparatuses 10 are present in the target space, channels which can be used by the wireless communication apparatuses 10 may be preset in the respective channel controllers 17 so that used channels do not overlap with each other or do not easily overlap even when channel bonding is performed.

In this case, the learned model 14 is trained using training data including a value representing the congestion of the target space, a bandwidth, and throughput. The AI processing section 15 inputs the value representing the congestion of the target space acquired by the information acquiring section 12 to the learned model 14 and acquires a bandwidth output by the learned model 14. The bandwidth controller 16 causes the wireless communication section 11 to perform wireless communication using the bandwidth acquired by the AI processing section 15. By contrast, the channel controller 17 controls the wireless communication section 11 by selecting a number of channels matching the bandwidth from the preset usable channels.

For example, it is assumed that ch. 1 to ch. 4 are set as usable channels for the channel controller 17. The frequency band per channel is assumed to be 20 MHz. In this example, when the AI processing section 15 has acquired a bandwidth of 40 MHz from the learned model 14, the channel controller 17 selects two consecutive channels (e.g., ch. 1 and ch. 2) from the usable channels ch. 1 to ch. 4.

In the fourth variation, the learning section 19 generates the learned model 14 by performing training using training data including the value representing the congestion of the target space acquired by the information acquiring section 12, the bandwidth used by the wireless communication section 11, and the throughput measurement result measured by the throughput measuring section 18. The learning section 19 also retrains the learned model 14 using the value representing the congestion of the target space acquired by the information acquiring section 12, the bandwidth used by the wireless communication section 11, and the throughput measurement result measured by the throughput measuring section 18.

<Fifth Variation>

The wireless communication apparatus 10 may be configured to include an operation section 20. Examples of the operation section 20 include a soft switch and a hard switch. The operation section 20 receives user operation to switch between automatic control and manual control. When the operation section 20 receives user operation to switch from automatic control to manual control, the bandwidth controller 16 causes the wireless communication section 11 to perform wireless communication in a prescribed bandwidth. When a certain period of time (e.g., 30 minutes) has elapsed from the time when automatic control was switched to manual control, the bandwidth controller 16 reverts from manual control to automatic control. In this way, a user can manually deactivate automatic control only for a short period of time in exceptional circumstances. This configuration can be utilized when the user wishes to prioritize throughput at the expense of radio interference.

For example, when a certain user wishes to raise the throughput of his or her own communication terminal 4 even if it causes some inconvenience to other users, the user can switch the wireless communication apparatus 10 from automatic control to manual control by operating the operation section 20 of the wireless communication apparatus 10 to which his or her communication terminal 4 is connected. The bandwidth controller 16 of the wireless communication apparatus 10 which has been switched to manual control forcibly selects the widest bandwidth (80 MHz in the example of FIG. 3).

In the above example, the bandwidth controller 16 selected the widest bandwidth when switched to manual control, but this is not a limitation. For example, the bandwidth controller 16 may select the narrowest bandwidth (20 MHz in the example of FIG. 3) when switched to manual control. The bandwidth during manual control is preset for the bandwidth controller 16. The bandwidth during manual control may also be changeable by the user operating the operation section 20.

What is claimed is:

1. A wireless communication apparatus comprising:
a wireless communication section configured to wirelessly communicate with a communication terminal present in a target space;
an information acquiring section configured to acquire a value representing congestion of the target space;
an Artificial Intelligence (AI) processing section configured to input the value representing the congestion of the target space acquired by the information acquiring section to a learned model trained with training data including the value representing the congestion of the target space, a bandwidth, and throughput, and configured to acquire a bandwidth output by the learned model; and a bandwidth controller configured to cause the wireless communication section to perform wireless communication using the bandwidth acquired by the AI processing section.

2. The wireless communication apparatus according to claim 1, further comprising:

a channel controller configured to control a channel used by the wireless communication section for the wireless communication, wherein the training data with which the learned model has been trained further includes a channel, the AI processing section inputs the value representing the congestion of the target space acquired by the information acquiring section to the learned model and acquires the bandwidth and a channel each output by the learned model, and the channel controller causes the wireless communication section to perform the wireless communication using the channel acquired by the AI processing section.

3. The wireless communication apparatus according to claim 1, wherein the information acquiring section acquires from an access management system a number of people present in the target space as the value representing the congestion of the target space acquired by the information acquiring section, the access management system being installed in the target space.

4. The wireless communication apparatus according to claim 1, wherein the information acquiring section acquires as the value representing the congestion of the target space a sum of a number of communication terminals connected to the wireless communication section and a number of communication terminals connected to a different wireless communication apparatus installed in the target space, the number of the communication terminals connected to the different wireless communication apparatus being acquired from the different wireless communication apparatus.

5. The wireless communication apparatus according to claim 1, further comprising:

a throughput measuring section configured to measure throughput of the wireless communication performed by the wireless communication section; and a learning section configured to retrain the learned model using the value representing the congestion of the target space acquired by the information acquiring section, a bandwidth used by the wireless communication section, and a throughput measurement result measured by the throughput measuring section.

6. The wireless communication apparatus according to claim 5, wherein the learning section generates the learned model by performing training using training data including the value representing the congestion of the target space acquired by the information acquiring section, the bandwidth used by the wireless communication section, and the throughput measurement result measured by the throughput measuring section.

7. The wireless communication apparatus according to claim 6, wherein the learning section collects the training data either or both daily and per time slot.

8. The wireless communication apparatus according to claim 1, further comprising:

an operation section configured to receive user operation to switch between automatic control and manual control, wherein when the operation section receives the user operation to switch from automatic control to manual control, the bandwidth controller causes the wireless communication section to perform the wireless communication using a prescribed bandwidth.

* * * * *